United States Patent
Perrin et al.

(10) Patent No.: US 7,606,812 B2
(45) Date of Patent: Oct. 20, 2009

(54) DYNAMIC INTENT LOG

(75) Inventors: Neil V. Perrin, Westminster, CO (US);
Stuart J. Maybee, Longmont, CO (US);
Jeffrey S. Bonwick, Los Altos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 454 days.

(21) Appl. No.: 11/513,768

(22) Filed: Aug. 31, 2006

(65) Prior Publication Data
US 2007/0106679 A1   May 10, 2007

Related U.S. Application Data

(60) Provisional application No. 60/733,454, filed on Nov. 4, 2005.

(51) Int. Cl.
*G06F 17/00* (2006.01)

(52) U.S. Cl. .......................................... 707/100
(58) Field of Classification Search ............... 707/1, 707/6, 10, 100, 101, 102, 200
See application file for complete search history.

(56) References Cited

U.S. PATENT DOCUMENTS 6,584,582 B1 *  6/2003  O'Connor .................... 714/21

\* cited by examiner

*Primary Examiner*—Fred I Ehichioya
(74) *Attorney, Agent, or Firm*—Osha • Liang LLP

(57) ABSTRACT

A method for dynamic intent logging in a file system. The method including pre-allocating a first log block, receiving a request to write a first set of deltas into a dynamic intent log, determining whether a size of the first set of deltas is larger than a size of the first log block, if the size of the first set of deltas is not larger than the size of the first log block, storing the first set of deltas in the first log block and pre-allocating a second log block.

13 Claims, 5 Drawing Sheets

DYNAMIC INTENT LOG

CROSS REFERENCE TO RELATED APPLICATIONS

This application claims benefit of U.S. Provisional Application Ser. No. 60/733,454 filed on Nov. 4, 2005, entitled "Dynamic Intent Log and Intent Log Testing" in the names of Neil V. Perrin, Jeffrey S. Bonwick, and Stuart J. Maybee.

BACKGROUND

Most modern file systems include a logging feature to ensure faster write times and crash recovery times. Intent logging is a type of file system journaling that enables faster file system operation and system boot. It is relatively simple to implement and inexpensive to the operation of the file system. Empirical tests have shown that logging file systems perform equal to or better than non-logging file systems.

The logging feature is a common option to a conventional file system. For example, Unix File System (UFS) includes a logging feature. More specifically, UFS supports intent logging. To implement intent logging, UFS initially allocates a certain amount of disk space within the persistent storage (e.g., hard disks, etc.). Within that space, an intent log (i.e., a data structure) is used to store all changes (i.e., "deltas") made to the metadata associated with the file system. The metadata associated with the file system typically corresponds to information related to the data in the file system, for example, the file name.

Once the metadata changes, the corresponding deltas are stored in the intent log. At a later time, the deltas in the intent log are committed to the file system. To commit the deltas in the intent log to the file system, the intent log is traversed and each delta that is encountered is committed to the file system. Once the file system (or a portion thereof) has been updated with the delta, then the delta is removed from the intent log.

During the typical operation of the logging feature, once a delta is generated (i.e., some file system metadata changes), a certain amount of disk space, in the disk space pre-allocated for the intent log, is requested. The amount of disk space requested corresponds to the size of the delta. If there is no unallocated space in the pre-allocated disk space (i.e., because the pre-allocated disk space is full), then deltas already stored in the intent log must be committed to the file system and removed from the intent log in order to make space for the new delta. While the currently stored deltas are being committed to the file system, applications using the file system are typically blocked until there is sufficient space to insert additional deltas.

SUMMARY

In general, in one aspect, the invention relates to a method for dynamic intent logging in a file system. The method including pre-allocating a first log block, receiving a request to write a first set of deltas into a dynamic intent log, determining whether a size of the first set of deltas is larger than a size of the first log block, if the size of the first set of deltas is not larger than the size of the first log block: storing the first set of deltas in the first log block, pre-allocating a second log block, if the size of the first set of deltas is larger than the size of the first log block: storing a first subset of the first set of deltas in the first log block, wherein a size of the first subset is less than or equal to the size of the first log block, for remaining deltas in the first set of delta: determining whether a size of the remaining deltas is larger than a maximum log block size; allocating a third log block and storing the remaining deltas in the second log block, if the size of the remaining deltas is not larger than the maximum log block size and wherein a size of the third log block is less than or equal to the maximum log block size, allocating a fourth log block and storing a second subset of the remaining deltas in the forth log block, if the size of the remaining deltas is larger than the maximum log block size, and wherein a size of the fourth log block is the maximum size log block.

In general, in one aspect, the invention relates to a computer readable medium comprising executable instructions for dynamic intent logging in a file system. The computer executable medium comprising instructions for pre-allocating a first log block, receiving a request to write a first set of deltas into a dynamic intent log, determining whether a size of the first set of deltas is larger than a size of the first log block, if the size of the first set of deltas is not larger than the size of the first log block: storing the first set of deltas in the first log block, pre-allocating a second log block, if the size of the first set of deltas is larger than the size of the first log block: storing a first subset of the first set of deltas in the first log block, wherein a size of the first subset is less than or equal to the size of the first log block, for remaining deltas in the first set of delta: determining whether a size of the remaining deltas is larger than a maximum log block size; allocating a third log block and storing the remaining deltas in the second log block, if the size of the remaining deltas is not larger than the maximum log block size and wherein a size of the third log block is less than or equal to the maximum log block size, allocating a fourth log block and storing a second subset of the remaining deltas in the forth log block, if the size of the remaining deltas is larger than the maximum log block size, and wherein a size of the fourth log block is the maximum size log block. In general, in one aspect, the invention relates to a file system, comprising a dynamic intent log and configured to pre-allocate a first log block, receive a request to write a first set of deltas into a dynamic intent log, determine whether a size of the first set of deltas is larger than a size of the first log block, if the size of the first set of deltas is not larger than the size of the first log block: store the first set of deltas in the first log block, pre-allocate a second log block, if the size of the first set of deltas is larger than the size of the first log block: store a first subset of the first set of deltas in the first log block, wherein a size of the first subset is less than or equal to the size of the first log block, for remaining deltas in the first set of delta: determine whether a size of the remaining deltas is larger than a maximum log block size; allocate a third log block and store the remaining deltas in the second log block, if the size of the remaining deltas is not larger than the maximum log block size and wherein a size of the third log block is less than or equal to the maximum log block size, allocate a fourth log block and store a second subset of the remaining deltas in the forth log block, if the size of the remaining deltas is larger than the maximum log block size, and wherein a size of the fourth log block is the maximum size log block.

Other aspects of the invention will be apparent from the following description and the appended claims.

DETAILED DESCRIPTION

Figure 1:
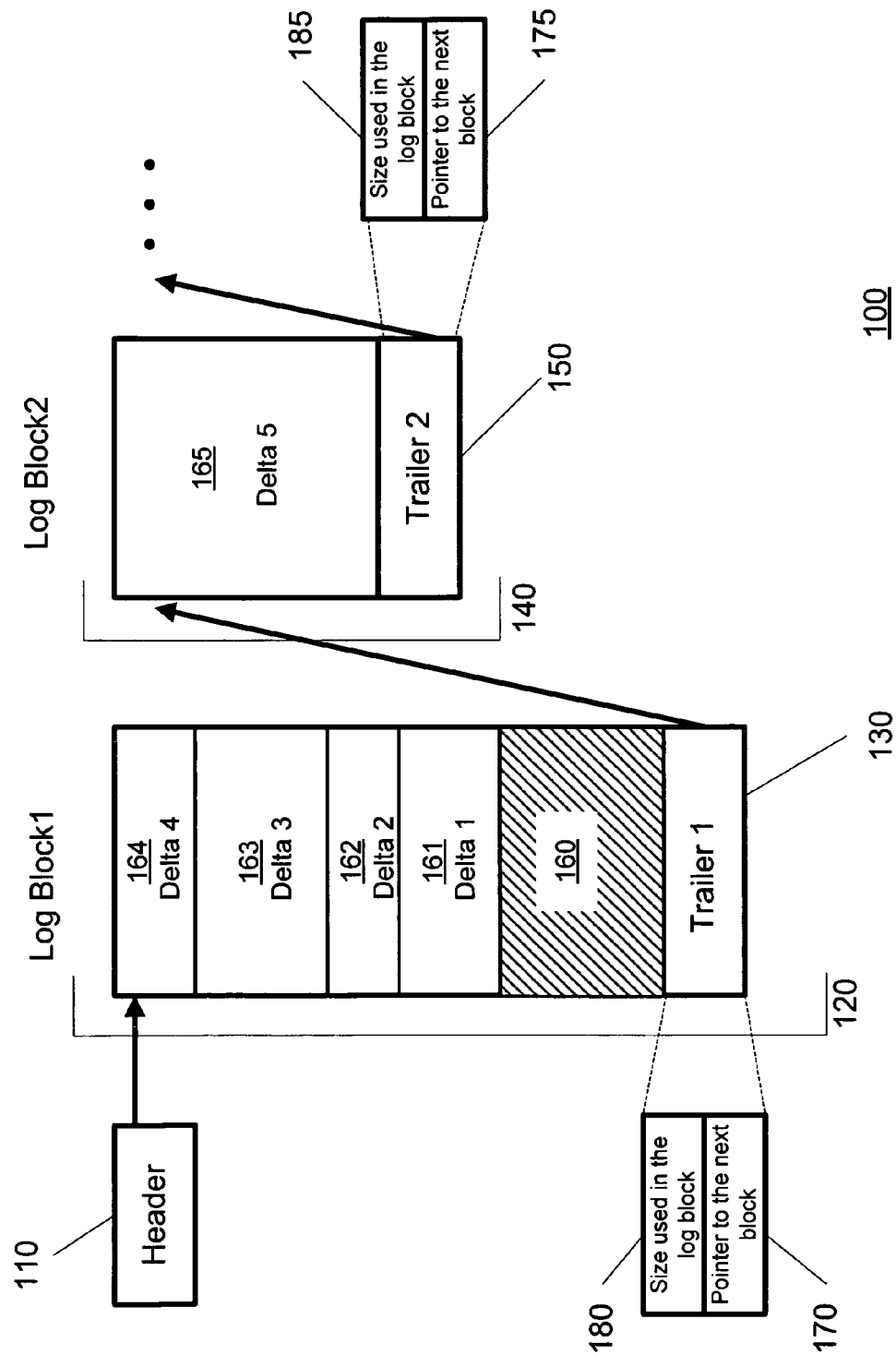
FIG. 1 shows a general structure of a dynamic intent log for a file system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and apparatus for intent logging. More specifically, embodiments of the invention relate to a method and apparatus for dynamically allocating log blocks in an intent log, where each of the log blocks is of variable size. Further, embodiments of the invention enable pre-allocation of additional log blocks.

In one or more embodiments of the invention, a file system is represented on disk as a hierarchical tree structure in which the leaf blocks contain data and the indirect blocks contain metadata. In one or more embodiments of the invention, the metadata includes directory and node information but not file data blocks, essentially everything but the actual data within the file.

In one or more embodiments of the invention, the file system implements a copy-on-write algorithm. More specifically, to write a modified data block to disk, the modified data block is written to a currently unused location on disk, rather than over-writing its existing location on disk. Once the modified data block is written, then its parent block must be modified to point to the new on-disk location of the modified data block. Accordingly, the modified parent block is written to a currently unused location on disk. The aforementioned procedure is continued up the hierarchical tree structure until the root of the hierarchical tree structure is reached. At this stage, the root, which is stored in a fixed location, is overwritten with a new root that is modified to point to one of the aforementioned modified blocks.

When file system logging is enabled for a file system (as described below), all changes to file system metadata or data (i.e., deltas) during synchronous Input/Output (I/O) requests are written to an intent log. The information in the intent log (typically stored in log blocks) is subsequently written to an appropriate location in the persistent storage, typically by a background process. In one or more embodiments of the invention, if logging is enabled, then logging is enabled for the duration of the mounted file system.

FIG. 1 shows a general structure of a dynamic intent log (100) in accordance with one or more embodiments of the invention. The dynamic intent log (100) comprises an intent log header (110), intent log trailers (130, 150), log blocks (120, 140), and a set of deltas (161, 162, 163, 164) for Log Block 1 (120) and a delta (i.e., delta 5 (165)) for Log Block 2 (140). In one or more embodiments of the invention, there is one dynamic intent log per file system. Those skilled in the art will appreciate that there may be one dynamic intent log per storage pool, as opposed to one dynamic intent log per file system.

In one or more embodiments of the invention, the header (110) references log block 1 (120) in the dynamic intent log (100). As shown in FIG. 1, the dynamic intent log includes a number of log blocks (e.g., 120, 140), where each log block includes one or more deltas (e.g., 161, 162, 163, 164, 165). Further, each log block (120, 140) is linked to at least one other log block (120, 140) via a block pointer (170, 175) stored in a log trailer (130, 150) of the previous log block (120, 140). In addition, the log trailer (130, 150) also includes functionality to keep track of the size (180, 185) of the delta(s) (161, 162, 163, 164, 165) stored in the log block (120, 140). More specifically, because the log blocks (120, 140) are pre-allocated (discussed below), the size of the log block (120, 140) may be larger than the size of a set of incoming deltas (161, 162, 163, 164, 165). In such cases, the log block (120, 140) may include unused space (e.g., 160).

Continuing with the discussion of FIG. 1, log blocks (120, 140) and the deltas (161, 162, 163, 164, 165) may vary in size. In one or more embodiments of the invention, the minimum log block size is 4 kilobytes and the maximum log block size is 128 kilobytes. Further, each log block is dynamically allocated, as needed, from available space in the persistent storage. In one or more embodiments of the invention, a set of deltas (161, 162, 163, 164) entering into a log block (120, 140) may be larger than the size of the current log block. In this case, the file system includes functionality to allocate additional log blocks (see FIGS. 2 and 3).

In one or more embodiments of the invention, after the set of deltas has been stored in the intent log, a new log block is pre-allocated prior to returning from a call to write a set of deltas into a log block. Accordingly, there is always at least one pre-allocated, empty log block in the dynamic intent log.

The size of the pre-allocated log block may be set using a number of methods. The following discussion details three methods that may be used to set the size of the pre-allocated log block. Those skilled in the art will appreciate that the following methods are not intended to limit the scope of the invention and, further, that any method may be used for setting the size of the pre-allocated log block.

Using one method, the size of the pre-allocated log block is the maximum size of all (or a subset of) previously used log blocks. For example, if three log blocks currently exist in a dynamic intent log and the size of each of the first two blocks is 10 kilobytes and the size of the third block is 15 kilobytes, then the pre-allocated size of the fourth block using the first method is 15 kilobytes (i.e., the maximum size of the first three log blocks). Using a second method, the size of the pre-allocated log block is the size of the current log block (i.e., the log block which precedes it in the dynamic intent log). Using a third method, the size of the pre-allocated log block is the size of a delta in a queue, where the queue includes deltas waiting to be stored in the dynamic intent log.

In one embodiment of the invention, the dynamic intent log may be stored in the storage pool along with other file system data (e.g., file system data and metadata). As an alternative, the dynamic intent log may be stored in a separated, dedicated logging device (e.g., separate persistent data store) operatively connected to the file system.

In one embodiment of the invention, a checksum is calculated for a set of deltas stored in the log block and the checksum is stored in the same log block. In one embodiment of the invention, the checksum is calculated using a set of deltas and some external information unique to that log block (e.g., the log block sequence number).

Figure 2:
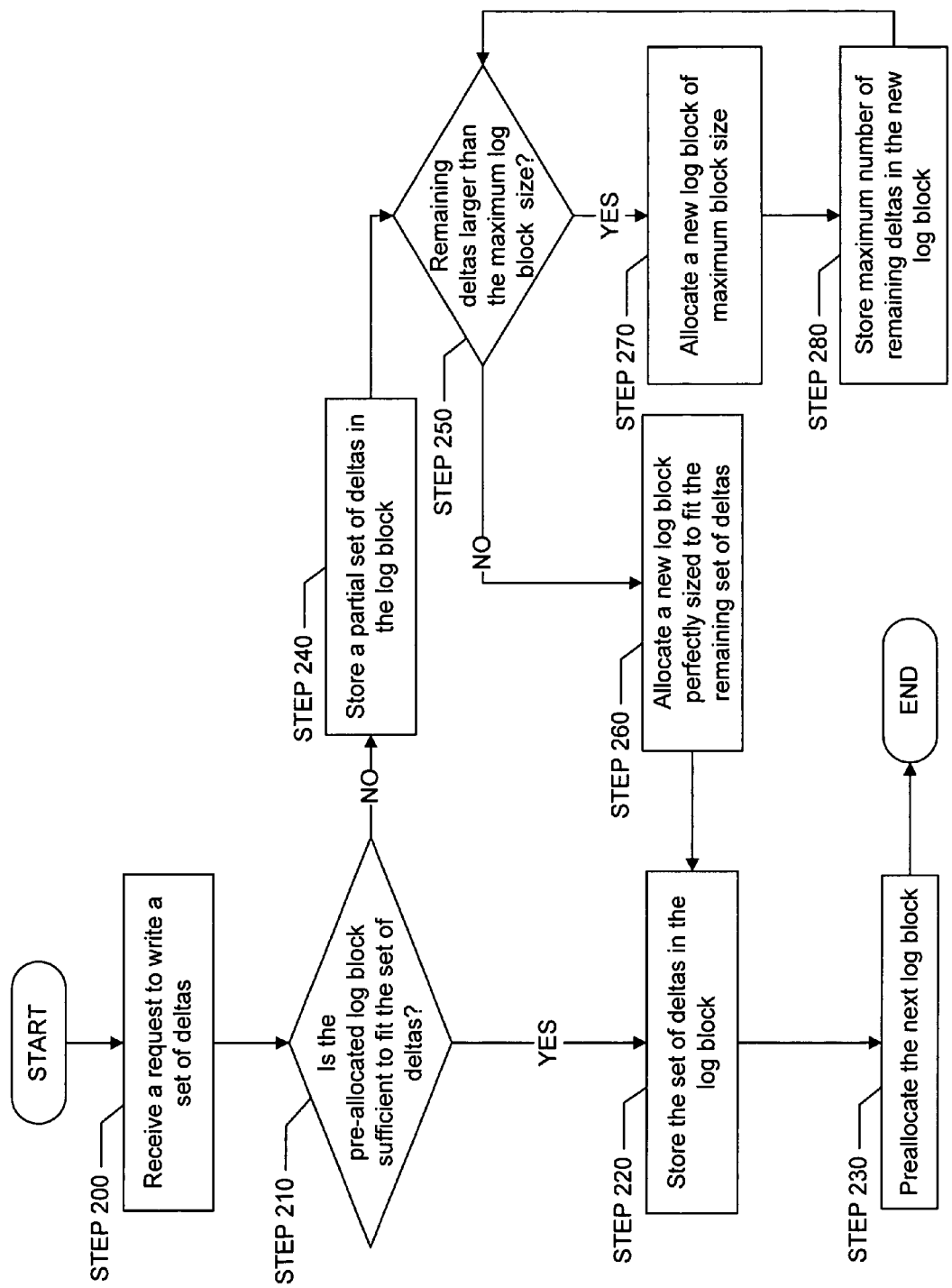
FIG. 2 shows a flowchart in accordance with one or more embodiments of the invention.

FIG. 2 shows a method of storing deltas in a dynamic intent log in accordance with one or more embodiments of the invention. First, a request to write a set of deltas is received by the dynamic intent log (STEP 200). Those skilled in the art will appreciate that each time a delta is generated it may not be immediately stored in a log block; rather, the deltas are accumulated in memory until an event triggers the writing of the accumulated deltas (i.e., the set of deltas) to the dynamic intent log. In one embodiment of the invention, the event corresponds to a fsync command.

Continuing with the discussion of FIG. 2, as stated previously, the dynamic intent log already includes a pre-allocated log block, which is ready to store the set of deltas. Therefore, when the request to write a delta is processed, a determination is made whether the pre-allocated log block is large enough to fit the incoming set of deltas (STEP 210). If the entire set of incoming deltas fit into the pre-allocated log block, then the file system completes storing of the set of incoming deltas (STEP 220). The file system subsequently pre-allocates a next log block and saves an address of the next log block in the current log block to create a link list to the next log block (STEP 230).

Continuing with the discussion of FIG. 2, if the entire set of incoming deltas does not fit into the current log block (i.e., the combined size of the set of deltas is larger than the size of the current log block) (STEP 210), then the file system stores a partial set of deltas in the current log block (STEP 240). More specifically, the maximum number of deltas in the set of deltas that can be stored in the current log block are stored in the current log block. At this stage, a determination is made about whether the combined size of the remaining deltas in the set of deltas (i.e., the deltas not stored in the current log block) is larger than a maximum block size (STEP 250). If the combined size of the remaining deltas in the set of deltas (i.e., the deltas not stored in the current log block) is larger than a maximum log block size, then the file system allocates a new log block with the maximum log block size (STEP 270) and stores as many of the remaining deltas into the new log block. (STEP 280). Once STEP 280 has been completed, the process proceeds to STEP 250.

If the combined size of the remaining deltas in the set of deltas (i.e., the deltas not stored in the current log block) is not larger than the maximum log block size, then the file system allocates a custom-sized new log block (i.e., a new log block is large enough to store all the of the remaining deltas) (STEP 260) and stores all remaining deltas in the new log block (STEP 220). At this stage, the entire set of deltas has been stored into one or more log blocks. Prior to returning from the original request to write the set of deltas to the dynamic intent log, the file system pre-allocates a log block, where the size of the log block is determined using one of the methods described previously (STEP 230). In one embodiment of the invention, the trailer of the current log block includes a reference to the pre-allocated log block.

Figure 3:
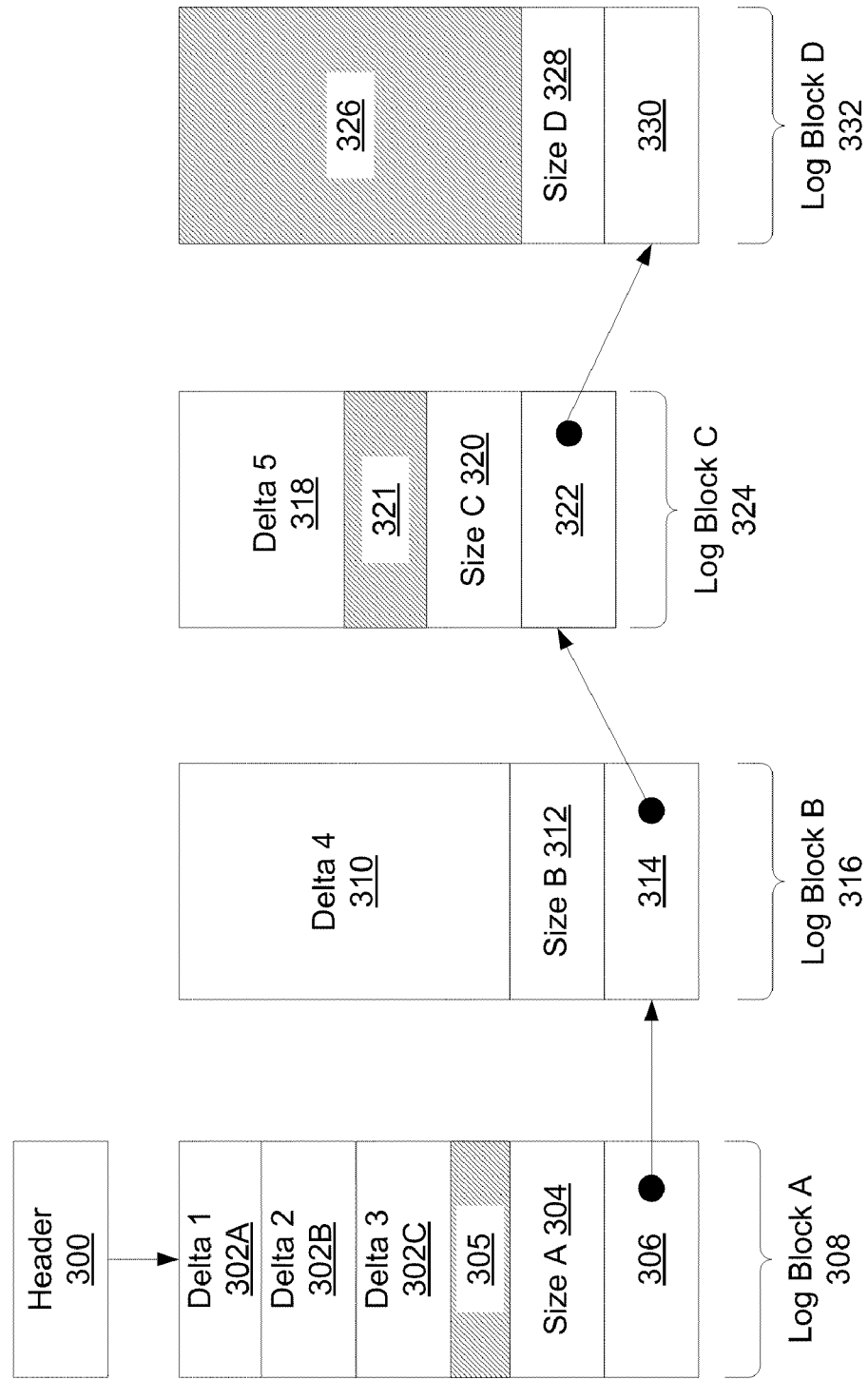
FIG. 3 shows an example in accordance with one or more embodiments of the invention.

FIG. 3 shows an example for storing a set of deltas using the method described in FIG. 2 in accordance with one embodiment of the invention. For the purposes of FIG. 3, assume that there is a set of five deltas (302A, 302B, 303C, 310, and 318) in memory awaiting to be stored in the dynamic intent log. Once a request to write the set of deltas (302A, 302B, 303C, 310, and 318) is received, an attempt is made to write all five deltas (302A, 302B, 303C, 310, and 318) into log block A (308). As shown in FIG. 3, log block A (308) is not large enough to store all of the deltas (302A, 302B, 303C, 310, and 318). Accordingly, the first three deltas (302A, 302B, 303C) are stored in log block A (308). However, because log block A (308) is larger than the combined size of delta 1 (302A), delta 2 (302B), and delta 3 (302C), but smaller than the combined size of delta 1 (302A), delta 2 (302B), delta 3 (302C), and delta 4 (310), log block A (308) includes an empty space (305). The file system subsequently stores the size (304) of deltas stored in log block A (308).

At this stage, one or more additional log blocks must be allocated to store the remaining deltas (i.e., delta 4 (310) and delta 5 (318)). Assuming that delta 4 (310) corresponds to the maximum size of the log block (excluding the trailer portion of the log block), the file system allocates a log block (i.e., log block B (310)) of maximum log block size. Once allocated, the file system saves a reference (306) of log block B (316) in log block A (308).

Continuing with the discussion of FIG. 3, once delta 4 (310) has been stored in log block B (316), the file system subsequently stores the size (312) of deltas stored in log block B (316). At this stage, there is one remaining delta to store (i.e., delta 5 (318). Since delta 5 (318) is smaller than the maximum log block size, a log block (i.e., log block C (324)) is allocated and the reference (314) to log block C (324) is stored in log block B (316). Delta 5 (318) is subsequently stored in log block C (324), and the file system stores the size (320) of deltas stored in log block C (324).

At this stage, all deltas have been stored, thus, a log block is pre-allocated using one of the methods described above. Once allocated, the file system saves a reference (322) to log block D (332) in log block C (324). The remaining space in log block C (324) is empty space (321) (i.e. no data is currently stored in this space). The size (328) of the deltas in log block D (332) and the reference (330) in log block D (332) are both set to null. The remaining space in log block D (332) is empty space (326).

Those skilled in the art will appreciate that while the above discussion indicates that the file system includes functionality to write to the dynamic intent log, another process related to, but separate from, the file system may perform the method described in FIGS. 2 and 3.

In one or more embodiments of the invention, the dynamic intent log may be used to optimize an applications' interaction with the file system. Further, in one or more embodiments of the invention, the dynamic intent log may be used to aid the file system in recovering from a system crash.

Figure 4:
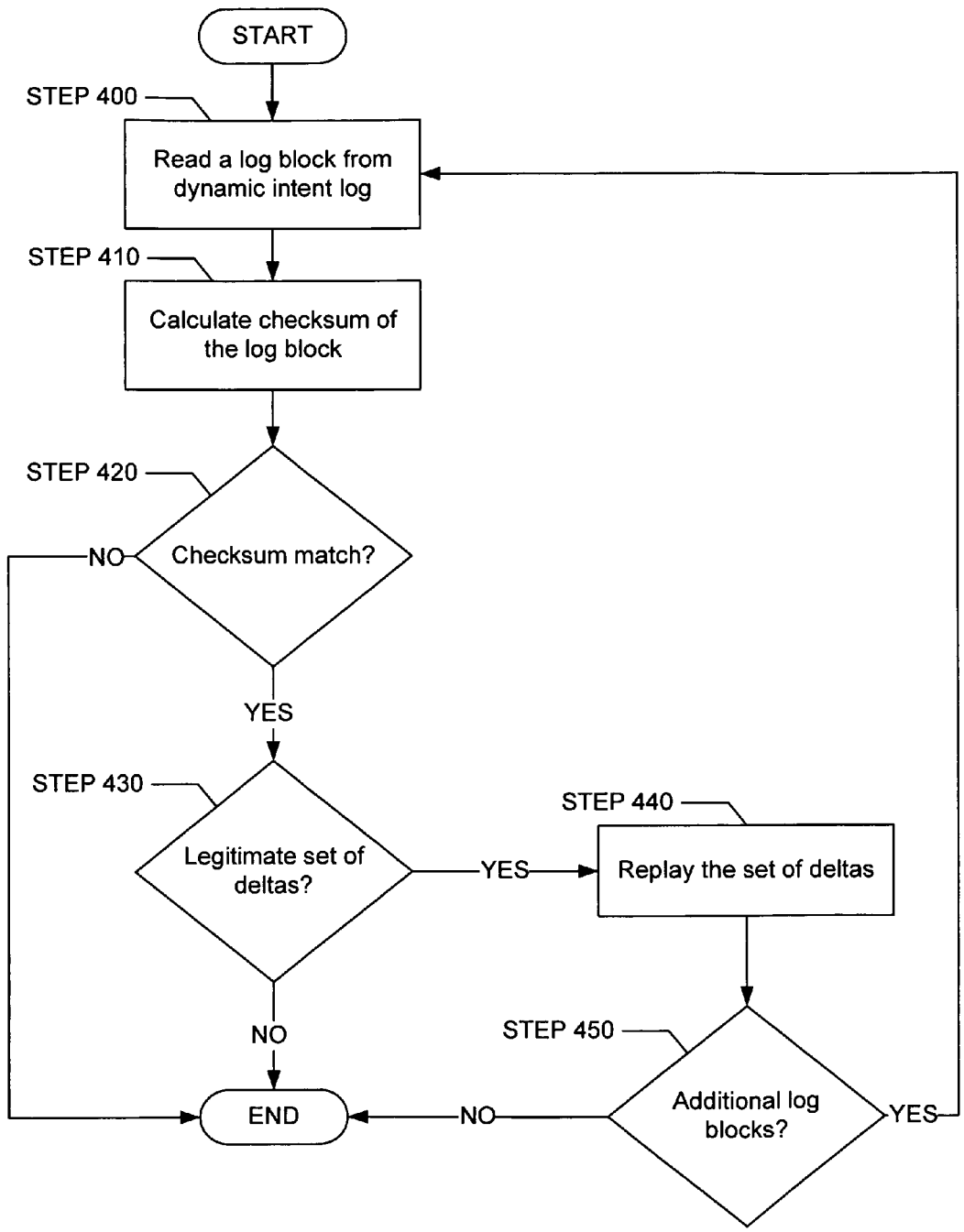
FIG. 4 shows a flowchart in accordance with one or more embodiments of the invention.

FIG. 4 shows a flowchart for replaying a chain of blocks in accordance with one or more embodiments of the invention. As shown in flowchart in FIG. 4, when replaying the deltas after a crash, the following flow occurs starting at the log block referenced by the header. In one or more embodiments of the invention, replaying of a set of deltas involves committing a system call intent expressed in each delta to the file system and tracking resulting changes in the file system.

Initially, a log block is read from a dynamic intent log (STEP 400). In the next step, a checksum of the log block is calculated (STEP 410). In one or more embodiments of the invention, a strong checksum is used to confirm data integrity of the log block.

In one or more embodiments of the invention, a checksum is a result of a mathematical operation on the data in the log block. The critical characteristic of a checksum is that even a small change in the log block (or more specifically, the data in the log block) results in a definitive change in its checksum. For example, a change of a single byte in the log block triggers an unavoidable difference in its checksum. A strong checksum assures data integrity better than a weak checksum. In typical applications, the weak checksum uses 32 bits and the strong checksum uses 256 bits. The extra bits in the strong checksum significantly reduces the chances of a random-chance checksum match.

Continuing with the discussion of FIG. 4, if the calculated checksum does not match a checksum value stored prior to forming the intent log block, the process ends (STEP 420). If the checksum matches, then determination is made whether the delta in the intent log block is legitimate (STEP 430). In one or more embodiments of the invention, the legitimacy of a delta in the log block is determined by comparing the state of a file system against the delta which expresses an intent of a system call. Recall that a delta indicates a particular intent (i.e. system call) to the file system. If the file system already committed the particular intent expressed in the delta but the delta still remains in the dynamic intent log, the situation suggests that the delta entry is illegitimate. If the delta is determined to be illegitimate, then the validation process ends since the illegitimate delta indicates the dynamic intent log itself is no longer valid. However, if the delta is legitimate, then it is replayed (i.e., it is committed to file system). Each delta entry in a set of deltas grouped by a particular log block is replayed (STEP 440). If there is an additional log block (STEP 450), this process repeats until a checksum mismatch occurs (STEP 420), an illegitimate delta (STEP 430) exists from the set of deltas, or no additional log block remains in the dynamic intent log (STEP 450).

In general, embodiments of the invention dynamically extend an intent log in a file system, such that writing out a delta only takes a single block write. The single block write may increase file system performance as there is a decreased wait time for applications interacting with the file system.

Figure 5:
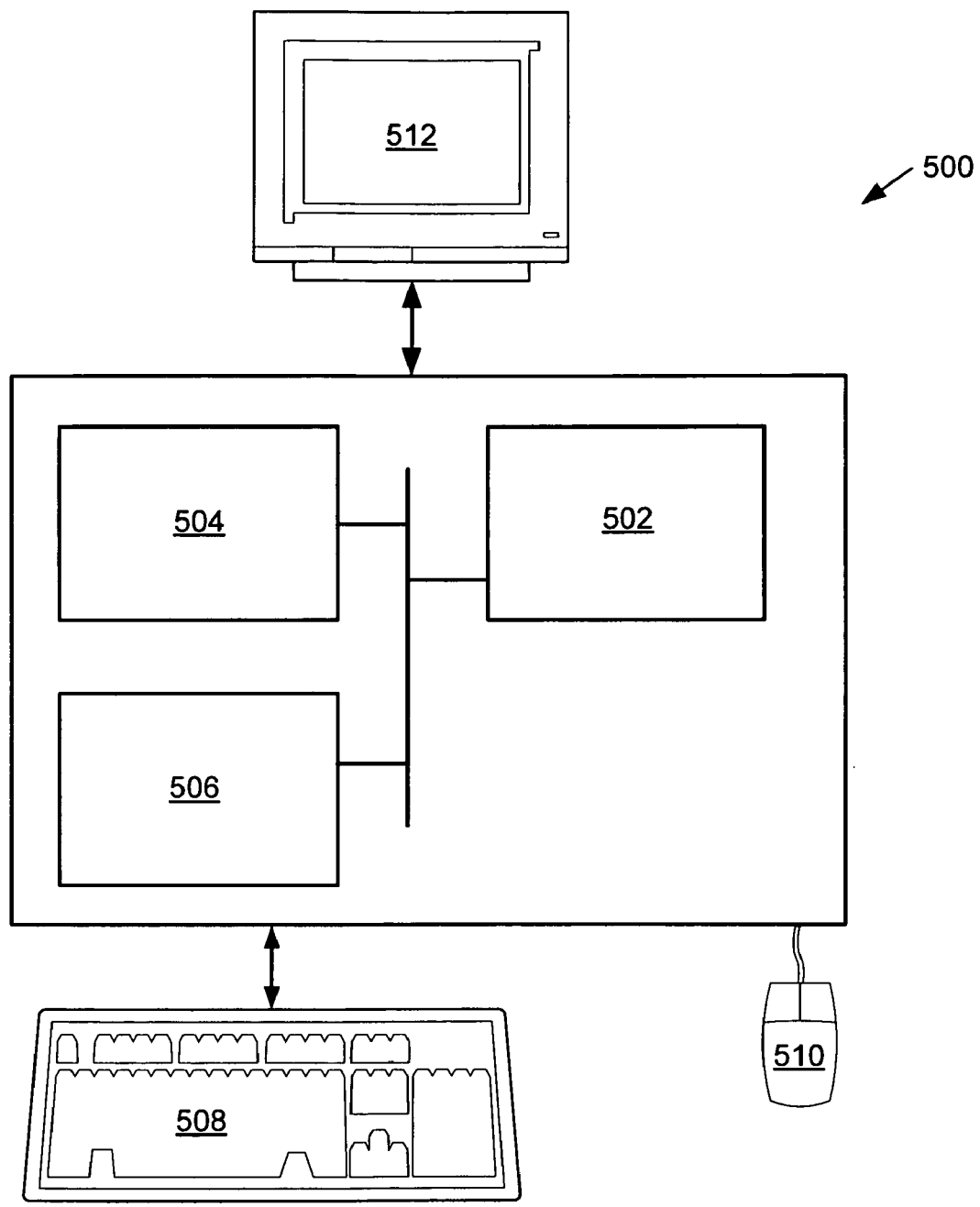
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer system (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a physical computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for dynamic intent logging in a file system, comprising:

pre-allocating a first log block, wherein the first log block is part of a chain of log blocks and a size of the first log block corresponds to a size of the largest block previously allocated in the chain of log blocks;

receiving a request to write a first set of deltas into a dynamic intent log, wherein the first set of deltas is stored in memory;

determining, using a processor, whether a size of the first set of deltas is larger than the size of the first log block;

if the size of the first set of deltas is not larger than the size of the first log block:
storing the first set of deltas in the first log block;
pre-allocating a second log block;

if the size of the first set of deltas is larger than the size of the first log block:
storing a first subset of the first set of deltas in the first log block, wherein a size of the first subset is less than or equal to the size of the first log block;
for remaining deltas in the first set of deltas:
determining whether a size of the remaining deltas is larger than a maximum log block size;
allocating a third log block and storing the remaining deltas in the third log block, if the size of the remaining deltas is not larger than the maximum log block size and wherein a size of the third log block is less than or equal to the maximum log block size;
allocating a fourth log block and storing a second subset of the remaining deltas in the forth log block, if the size of the remaining deltas is larger than the maximum log block size, and wherein a size of the fourth log block is the maximum size log block, wherein a size of the second log block is one selected from a group consisting of (a) the size of the first log block if the size of the first set of deltas is not larger than the first log block and (b) a size of one of a second set of deltas waiting in a queue.

2. The method of claim 1, further comprising:
storing the size of the first set of deltas in the first log block, if the size of the first set of deltas is not larger than the first log block, and
storing the size of the first subset of deltas in the first log block, if the size of the first set of deltas is larger than the first log block.

3. The method of claim 1, further comprising:
replaying the first log block.

4. The method of claim 3, wherein replaying the first log block comprises:
calculating a checksum of the first log block;
determining whether the first log block is legitimate, if the checksum of the first log block is valid; and
replaying the first log block if the first log block is legitimate.

5. A computer readable medium comprising executable instructions for dynamic intent logging in a file system by:
pre-allocating a first log block, wherein the first log block is part of a chain of log blocks and a size of the first log block corresponds to a size of the largest block previously allocated in the chain of log blocks;
receiving a request to write a first set of deltas into a dynamic intent log;
determining whether a size of the first set of deltas is larger than the size of the first log block;
if the size of the first set of deltas is not larger than the size of the first log block:
storing the first set of deltas in the first log block;
pre-allocating a second log block;
if the size of the first set of deltas is larger than the size of the first log block:

storing a first subset of the first set of deltas in the first log block, wherein a size of the first subset is less than or equal to the size of the first log block;

for remaining deltas in the first set of delta:

determining whether a size of the remaining deltas is larger than a maximum log block size;

allocating a third log block and storing the remaining deltas in the third log block, if the size of the remaining deltas is not larger than the maximum log block size and wherein a size of the third log block is less than or equal to the maximum log block size;

allocating a fourth log block and storing a second subset of the remaining deltas in the forth log block, if the size of the remaining deltas is larger than the maximum log block size, and wherein a size of the fourth log block is the maximum size log block, wherein a size of the second log block is one selected from a group consisting of (a) the size of the first log block if the size of the first set of deltas is not larger than the first log block and (b) a size of one of a second set of deltas waiting in a queue.

6. The computer readable medium of claim 5, further comprising executable instructions for dynamic intent logging in the file system by:

storing the size of the first set of deltas in the first log block, if the size of the first set of deltas is not larger than the first log block, and storing the size of the first subset of deltas in the first log block, if the size of the first set of deltas is larger than the first log block.

7. The computer readable medium of claim 5, further comprising:

replaying the first log block.

8. The computer readable medium of claim 7, wherein replaying the first log block comprises:

calculating a checksum of the first log block;

determining whether the first log block is legitimate, if the checksum of the first log block is valid; and replaying the first log block if the first log block is legitimate.

9. A computer system comprising:

a processor;

a file system, when executed on the processor, is configured to:

pre-allocate a first log block, wherein the first log block is part of a chain of log blocks and a size of the first log block corresponds to a size of the largest block previously allocated in the chain of log blocks;

receive a request to write a first set of deltas into the dynamic intent log;

determine whether a size of the first set of deltas is larger than the size of the first log block;

if the size of the first set of deltas is not larger than the size of the first log block:

store the first set of deltas in the first log block;

pre-allocate a second log block;

if the size of the first set of deltas is larger than the size of the first log block:

store a first subset of the first set of deltas in the first log block, wherein a size of the first subset is less than or equal to the size of the first log block;

for remaining deltas in the first set of delta:

determine whether a size of the remaining deltas is larger than a maximum log block size;

allocate a third log block and storing the remaining deltas in the third log block, if the size of the remaining deltas is not larger than the maximum log block size and wherein a size of the third log block is less than or equal to the maximum log block size;

allocate a fourth log block and storing a second subset of the remaining deltas in the forth log block, if the size of the remaining deltas is larger than the maximum log block size, and wherein a size of the fourth log block is the maximum size log block, wherein a size of the second log block is one selected from a group consisting of (a) the size of the first log block if the size of the first set of deltas is not larger than the first log block and (b) a size of one of a second set of deltas waiting in a queue.

10. The file system of claim 9, further configured to:

store the size of the first set of deltas in the first log block, if the size of the first set of deltas is not larger than the first log block, and store the size of the first subset of deltas in the first log block, if the size of the first set of deltas is larger than the first log block.

11. The file system of claim 9, further configured to:

replaying the first log block.

12. The file system of claim 11, wherein replaying the first log block comprises:

calculating a checksum of the first log block;

determining whether the first log block is legitimate, if the checksum of the first log block is valid; and replaying the first log block if the first log block is legitimate.

13. The file system of claim 9, wherein the first log block is part of a chain of log blocks and the size of the first log block corresponds to a size of the largest block previously allocated in the chain of log blocks.

* * * * *

UNITED STATES PATENT AND TRADEMARK OFFICE
CERTIFICATE OF CORRECTION

| | | |
|---|---|---|
| PATENT NO. | : 7,606,812 B2 | |
| APPLICATION NO. | : 11/513768 | |
| DATED | : October 20, 2009 | |
| INVENTOR(S) | : Perrin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Twelfth Day of October, 2010

David J. Kappos
*Director of the United States Patent and Trademark Office*